(12) United States Patent
Haans et al.

(10) Patent No.: US 8,092,172 B2
(45) Date of Patent: Jan. 10, 2012

(54) METHOD FOR OPERATING A WIND TURBINE WITH REDUCED BLADE FOULING

(75) Inventors: Wouter Haans, Den Haag (NL); Jacob Johannes Nies, Zwolle (NL)

(73) Assignee: General Electric Company, Schenectady, NY (US)

( * ) Notice: Subject to any disclaimer, the term of this patent is extended or adjusted under 35 U.S.C. 154(b) by 34 days.

(21) Appl. No.: 12/613,079

(22) Filed: Nov. 5, 2009

(65) Prior Publication Data
US 2010/0143121 A1  Jun. 10, 2010

(51) Int. Cl.
*F01D 5/18* (2006.01)
(52) U.S. Cl. .................. 416/1; 416/61; 416/91
(58) Field of Classification Search .......... 416/1, 31, 416/36, 37, 39, 41, 42, 61, 90 A, 90 R, 91, 416/92; 290/44, 55
See application file for complete search history.

(56) References Cited

U.S. PATENT DOCUMENTS

| | | | |
|---|---|---|---|
| 4,692,095 A | 9/1987 | Lawson-Tancred | |
| 5,938,404 A | 8/1999 | Domzalski et al. | |
| 6,629,674 B1 | 10/2003 | Saddoughi et al. | |
| 6,940,185 B2 * | 9/2005 | Andersen et al. | 290/44 |
| 6,972,498 B2 | 12/2005 | Jamieson et al. | |
| 7,354,247 B2 * | 4/2008 | Bonnet | 416/90 R |
| 7,363,808 B2 | 4/2008 | Ormel et al. | |
| 7,387,491 B2 * | 6/2008 | Saddoughi et al. | 416/62 |
| 7,420,289 B2 | 9/2008 | Wang et al. | |
| 7,582,977 B1 | 9/2009 | Dehlsen | |
| 7,637,715 B2 * | 12/2009 | Battisti | 415/115 |
| 2001/0038798 A1 * | 11/2001 | Foster | 417/478 |
| 2005/0042102 A1 | 2/2005 | Teichert | |
| 2005/0242233 A1 * | 11/2005 | Battisti | 244/58 |
| 2007/0231151 A1 | 10/2007 | Herr et al. | |
| 2009/0140862 A1 * | 6/2009 | Eggleston | 340/573.1 |
| 2009/0304505 A1 | 12/2009 | Wobben | |
| 2009/0311097 A1 | 12/2009 | Pierce et al. | |

(Continued)

FOREIGN PATENT DOCUMENTS
DE  10 2006 032 387 A1  1/2008
(Continued)

OTHER PUBLICATIONS

Gustave P. Corten & Herman F. Veldkamp, "Insects Can Halve Wind-Turbine Power," 412 Nature, 42-43 (2001).*
Office Action dated Oct. 5, 2010, U.S. Appl. No. 12/613,170, 21 pages.
Office Action dated Aug. 19, 2010, U.S. Appl. No. 12/613,274, 17 pages.
(Continued)

*Primary Examiner* — Edward Look
*Assistant Examiner* — Aaron R Eastman
(74) *Attorney, Agent, or Firm* — James McGinness, Esq.; Armstrong Teasdale LLP

(57) ABSTRACT

A method of operating a wind turbine is provided. The wind turbine has at least one rotor blade and an active flow control (AFC) system. The at least one rotor blade has at least one aperture defined through a surface thereof, and the AFC system is configured to modify aerodynamic properties of the at least one rotor blade by ejecting gas through the at least one aperture. The method includes operating the wind turbine in a first mode, determining an environmental condition surrounding the wind turbine indicative of fouling of the AFC system, and operating the wind turbine in a second mode different than the first mode based on the environmental condition. The second mode facilitates reducing fouling of the AFC system.

16 Claims, 9 Drawing Sheets

U.S. PATENT DOCUMENTS

| | | | |
|---|---|---|---|
| 2010/0076614 A1* | 3/2010 | Nies et al. | 700/287 |
| 2010/0135790 A1 | 6/2010 | Pal et al. | |
| 2010/0135794 A1* | 6/2010 | Nies et al. | 416/1 |
| 2010/0135795 A1* | 6/2010 | Nies et al. | 416/1 |

FOREIGN PATENT DOCUMENTS

| | | |
|---|---|---|
| EP | 1517033 A1 | 3/2005 |
| GB | 2186033 A | 8/1987 |
| GB | 2466433 A | 6/2010 |
| WO | 2004092577 A1 | 10/2004 |
| WO | 2008080407 A1 | 7/2008 |

OTHER PUBLICATIONS

David F. Fisher & Michael C. Fischer, Development Flight Tests of Jetstar LFC Leading-Edge Flight Test Experiment, (NASA, Langley Research Center ed., 1987).

Albert L. Braslow, "A History of Suction-Type Laminar-Flow Control with Emphasis on Flight Research," Monographs in Aerospace History, No. 13, pp. 20, 21, 24 (1999).

Hal Romanowitz, "Alternate Energy Systems Engineering," available at www.oakcreekenergy.com/reports/flash/GCI-20020401.html (last visited Mar. 2, 2009).

* cited by examiner

METHOD FOR OPERATING A WIND TURBINE WITH REDUCED BLADE FOULING

CROSS-REFERENCE TO RELATED APPLICATIONS

Cross-reference is hereby made to related, commonly assigned, applications: U.S. Ser. No. 12/613,157 entitled "Active Flow Control System for Wind Turbine" and issued as U.S. Pat. No. 7,883,313, U.S. Ser. No. 12/613,287 entitled "Systems and Methods for Assembling an Air Distribution System for Use in a Rotor Blade of a Wind Turbine," U.S. Ser. No. 12/613,013 entitled "Systems and Method for Operating a Wind Turbine Having Active Flow Control," U.S. Ser. No. 12/613,268 entitled "Apparatus and Method for Cleaning an Active Flow Control (AFC) System of a Wind Turbine" and issued as U.S. Pat. No. 7,931,445, U.S. Ser. No. 12/613,170 entitled "Systems and Method for Operating an Active Flow Control System," U.S. Ser. No. 12/613,274 entitled "Systems and Method for Operating a Wind Turbine Having Active Flow Control." Each cross-referenced application is invented by Jacob Johannes Nies and Wouter Haans and is filed on the same day as this application. Each cross-referenced application is hereby incorporated by reference in its entirety.

BACKGROUND OF THE INVENTION

The present disclosure relates to methods of operating a wind turbine with reduced fouling, particularly to wind turbines having an active flow control (AFC) system, and a wind turbine including such AFC system.

Although horizontal axis wind turbines are well-established these days, there is still considerable engineering effort going on to further improve their overall efficiency, robustness, and power generating capability.

This research has lead to the most recent AFC technologies which aim to improve wind turbine efficiency. AFC technologies try to avoid flow separation over rotor blades by actively modifying the wind flow proximate to the rotor blade. This can be achieved by ejecting gas through apertures formed in the surface of the rotor blade.

The introduction of such AFC systems has brought about the fact that the apertures used for blowing gas eventually collect dirt or impurities. This phenomenon is one aspect of what is referred to as blade fouling. Blade fouling can substantially lower the performance, in particular the extracted power of wind turbines.

BRIEF DESCRIPTION OF THE INVENTION

In one aspect, a method of operating a wind turbine is provided. The wind turbine has at least one rotor blade and an active flow control (AFC) system. The at least one rotor blade has at least one aperture defined through a surface thereof, and the AFC system is configured to modify aerodynamic properties of the at least one rotor blade by ejecting gas through the at least one aperture. The method includes operating the wind turbine in a first mode, determining an environmental condition surrounding the wind turbine indicative of fouling of the AFC system, and operating the wind turbine in a second mode different than the first mode based on the environmental condition. The second mode facilitates reducing fouling of the AFC system.

In another aspect, a method of operating a wind turbine is provided. The wind turbine has at least one rotor blade and an active flow control (AFC) system. The at least one rotor blade includes at least one aperture defined through a surface of the at least one rotor blade, and the AFC system is configured to modify aerodynamic properties of the at least one rotor blade. The method includes determining an environmental condition surrounding the wind turbine indicative of precipitation, and adjusting at least one of a pitch angle and an azimuth angle of the at least one rotor blade such that the at least one aperture is wetted.

In yet another aspect, a wind turbine is provided. The wind turbine includes at least one rotor blade and an active flow control (AFC) system at least partially defined in the at least one rotor blade. The AFC system is configured to modify aerodynamic properties of the at least one rotor blade. The wind turbine further includes a sensor configured to measure an environmental condition surrounding the wind turbine, and a wind turbine controller. The wind turbine controller is configured to operate the wind turbine in a first mode, and operate the wind turbine in a second mode different than the first mode depending on the environmental condition. The second mode includes adjusting at least one operation parameter of the wind turbine such that fouling of the AFC system is reduced.

Further aspects, advantages and features of the embodiments described herein are apparent from the dependent claims, the description, and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Modern wind turbines are designed to produce a maximum amount of energy. However, if the wind speed becomes too large and therefore changes an angle of attack above a certain value, flow separation over wind turbine blades occurs and results in stall. In such a situation, energy production by the turbine is reduced. If he flow separation over wind turbine blades can be delayed, the design of the wind turbine can be favorably changed, e.g. to increase the production of energy across the wind speed range and/or to change design parameters such as chord. This will eventually result in a considerable increase of wind turbine energy production.

Flow separation over wind turbine blades can be delayed by blowing gas out of small apertures arranged at the surface of the rotor blade. The gas may be fed to the apertures through manifolds within the rotor blade by a gas supply. Various gases may be used, such as, but not limited to air, nitrogen, or carbon dioxide. In the following, the term "air" will be exemplarily used without any intention to limit the scope of the appended claims. The gas flow rate through the manifolds and out of the apertures is controlled by the gas supply. Controlling the gas flow rate results in delayed flow separation, which changes the aerodynamic properties of the rotor blade. The system, including a gas supply, manifolds, and apertures, actively controls a gas flow out of the apertures of the rotor blade. This system is referred to as an active flow control (AFC) system.

Although the embodiments described herein are illustrated with respect to a nonzero-net-mass flow control system, it should be understood that the systems and methods described herein can also be used with a zero-net-mass flow control system.

Figure 1:
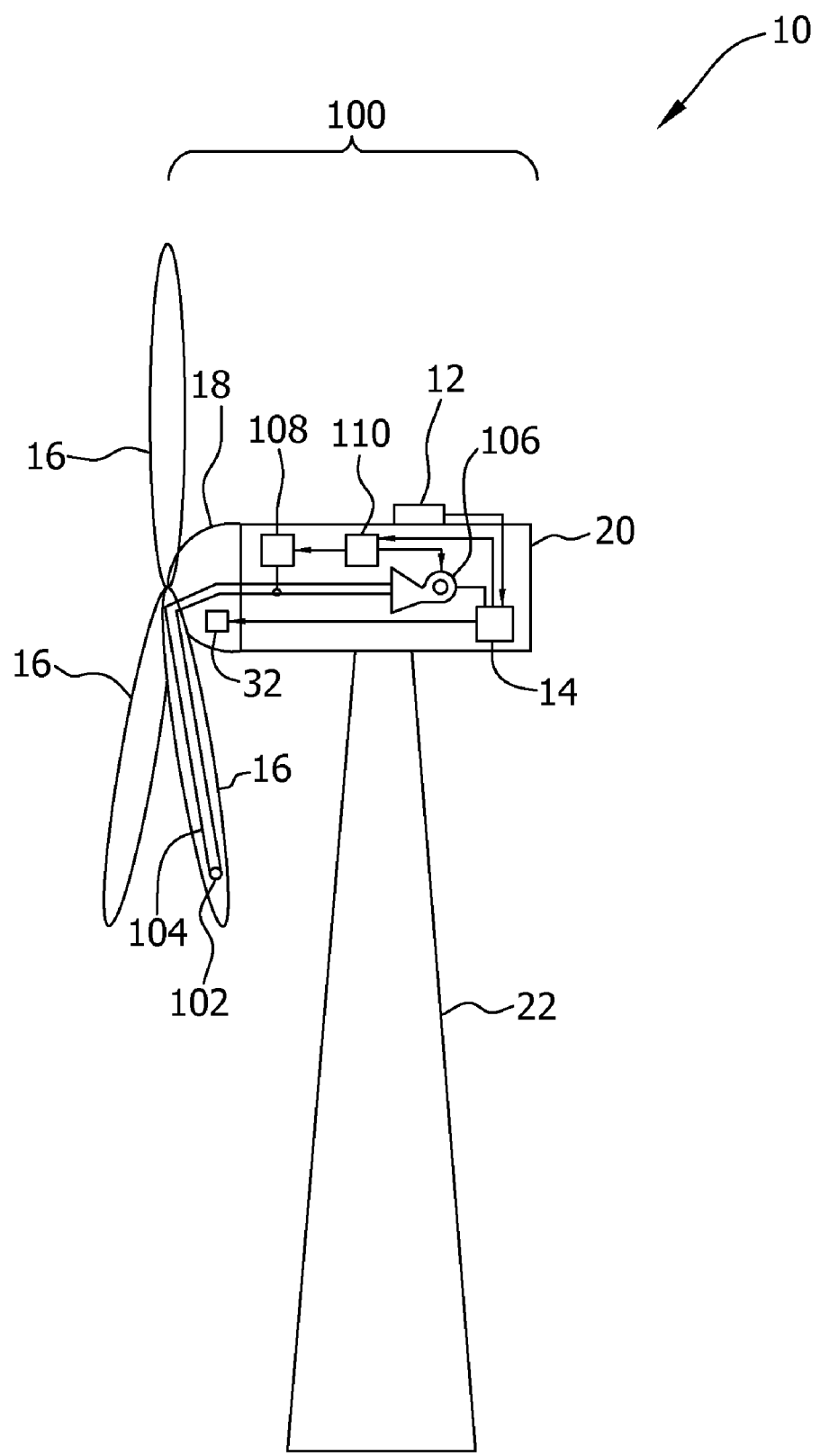
FIG. 1 is a schematic side view of an exemplary wind turbine.
Figure 2:
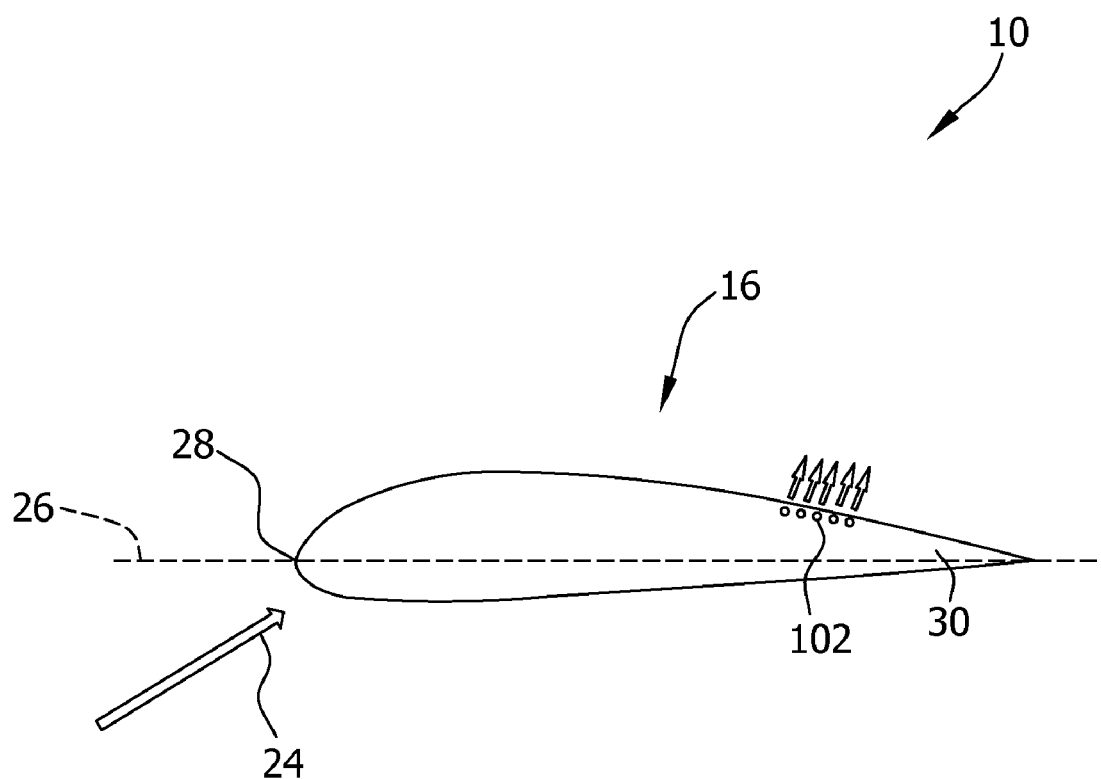
FIG. 2 is a chord-wise cross sectional view of an exemplary rotor blade that may be used with the wind turbine shown in FIG. 1.

FIG. 1 shows an exemplary wind turbine 10 having an AFC system 100, a sensor 12, and a wind turbine controller 14. FIG. 2 shows a chord-wise cross-sectional view of a rotor blade 16 being equipped with AFC system 100. As shown in FIG. 1, wind turbine 10 includes three rotor blades 16, however, wind turbine 10 may include more or less than three rotor blades 16. Rotor blades 16 are mounted on a rotor hub 18 that is connected to a nacelle 20 fixed on top of a tower 22. FIG. 2 shows a position of AFC apertures 102 of rotor blade 16. In FIG. 2, rotor blade 16 is seen along a span-wise axis of rotor blade 16. In typical situations, a wind direction 24 impinges rotor blade 16 at an area slightly above where a chord line 26 intersects rotor blade 16 at a leading edge 28 of rotor blade 16.

Aerodynamic properties of rotor blade 16 are changed by gas being ejected through apertures 102 defined through a surface 30 of rotor blade 16 on its suction side. Apertures 102 are typically positioned on the suction side of rotor blade 16 downwind of the airfoil maximum thickness. In FIG. 2 the suction side is an upper side of rotor blade 16. According to other embodiments, apertures 102 are positioned on a rotor blade section where flow separation mainly occurs.

According to embodiments disclosed herein, blade fouling of wind turbine 10, and especially fouling of apertures 102 and manifolds 104 included inside rotor blade 16, is avoided, or at least reduced, by operating wind turbine in a preventive manner such that AFC system 100, and especially manifolds 104 and apertures 102 of AFC system 100 collect less contamination or are not subject to contaminants in the first place.

In the embodiment shown in FIG. 1, each rotor blade 16 includes at least one manifold 104. At a downstream end, manifold 104 is connected to at least one aperture 102 at surface 30 of rotor blade 16. For reasons of simplicity, only one rotor blade 16 with only one manifold 104 and one aperture 102 is depicted. However, a plurality of manifolds 104, typically of different lengths, can be provided within rotor blade 16. Furthermore, each manifold 104 is connected to a plurality of apertures 102. Although depicted only for one rotor blade 16, the other rotor blades 16 include manifolds 104 and apertures 102. At an upstream end, manifold 104 is connected to a gas supply 106 from which gas is supplied to manifold 104. In this context, the terms "upstream" and "downstream" refer to gas flow directions within AFC system 100. In particular, the downstream direction is defined to be from gas supply 106 to aperture 102. The downstream direction is a direction of gas flow during an AFC mode in which gas is ejected through apertures 102 of rotor blades 16 in order to improve the aerodynamic properties of rotor blade 16. On the other hand, the upstream direction is defined as a direction from apertures 102 towards gas supply 106. In the embodiment shown in FIG. 1, gas supply 106 is located inside nacelle 20. According to other embodiments, gas supply 106 may also be located inside tower 22, inside rotor hub 18, and/or inside rotor blade 16. According to alternative embodiments, there is provided one gas supply 106 for each rotor blade 16. According to some of these embodiments, in each rotor blade 16 there is provided one gas supply 106.

According to the embodiment of FIG. 1, each manifold 104 is configured to channel gas and is connected to a valve 108. Each valve 108 is configured to block a gas flow to a respective manifold 104 and is positioned within nacelle 20 of wind turbine 10. Each valve 108 may be continuously adjusted from completely open to completely closed. It is to be understood that the term "blocking" does not necessarily mean complete blocking, but may also imply partial blocking of manifolds 104. Valves 108 may thus have a flow control function. If valve 108 is not closed completely, the gas flow through the remaining valves 108 is not increased to the same extent as compared to the case when valve 108 closes completely. According to some embodiments, valves 108 may be replaced by other flow control devices which are configured to control gas flows of manifolds 104. According to other embodiments, valves 108 may also be positioned inside rotor hub 18, inside a rotor blade 16, or inside tower 22. The latter arrangement may be used when gas supply 106 is located inside tower 22. Manifolds 104 of rotor blades 16 are typically connected in parallel to gas supply 106 and may be blocked by their respective valves 108. An AFC controller 110, which may be included in or separate from wind turbine controller 14, controls valves 108 and gas supply 106. This control is indicated by arrows in FIG. 1. The foregoing is merely exemplary and should not be construed as limiting because the present application also encompasses embodiments without valves 108.

A gas flow rate through manifolds 104 is controlled by AFC controller 110. According to one embodiment, AFC controller 110 controls the gas flow rate through manifolds 104 by changing the gas flow rate of gas supply 106. According to a further embodiment, AFC controller 110 controls the gas flow rate through manifolds 104 by blocking, e.g. manifold 104, thereby increasing the gas flow rate through the unblocked manifolds 104. Thus, an ejection pattern of ejected air is altered and the aerodynamic properties of rotor blade 16 are varied. For blocking manifolds 104, AFC controller 110 may use valves 108. Each valve 108 may be continuously adjusted from completely open to completely closed, blocking the gas flow in the latter case. AFC controller 110 is part of AFC system 100, which includes manifolds 104, apertures 102, air supply 106, and valves 108. According to the embodiments described above, AFC system 100, particularly AFC controller 110, are configured to modify the aerodynamic properties of rotor blades 16 which typically results in delaying a flow separation over rotor blades 16.

In the embodiment shown in FIG. 1, wind turbine controller 14 controls AFC controller 110, gas supply 106, and a pitch controller 32. According to further embodiments, wind turbine controller 14 further controls a yaw angle and/or a generator speed. Generally, wind turbine controller 14 is configured to adjust at least one operation parameter of wind turbine 10 based on an environmental condition measured by sensor 12 such that fouling of AFC system 100 is reduced. According to the embodiment shown in FIG. 1, AFC controller 110 controls gas supply 106, while wind turbine controller 14 controls AFC controller 110. According to other embodiments, wind turbine controller 14 controls gas supply 106. Generally, wind turbine controller 14 may control any operation parameter of wind turbine 10. Operation parameters includes, but are not limited to including, a rotational speed, a pitch angle of rotor blades 16, a yaw angle, and/or a gas flow rate through AFC system 100, in particular through gas supply 106.

Sensor 12 is configured to measure an environmental condition surrounding wind turbine 10. The environmental condition is indicative of fouling of AFC system 100. The environmental condition is processed by wind turbine controller 14 to determine how to operate wind turbine 10. Although depicted at nacelle 20, sensor 12 may also be located in or at tower 22, inside rotor hub 18, inside rotor blade 16, and/or away from wind turbine 10. For example, sensor 12 may be a weather station installed near wind turbine 10 or at least near a wind farm in which wind turbine 10 is located.

The environmental condition includes, without limitation, an air humidity, a wind speed, an air temperature, an aerosol concentration, an airborne particle concentration, an airborne contaminants concentration, a concentration of any sort of flora, fauna, and/or any by-products thereof (e.g. fluff), a wind direction, a rain direction, a frequency of wind gusts, an atmospheric pressure, a wind chill factor, a cloud height, a cloud cover, a visibility, a dew point, a migration of birds and/or other animals, and/or a frequency and/or an amount of animal excrement, in particular bird droppings. Furthermore, any combination of two or more of the foregoing environmental conditions may be used to determine whether an increased risk for AFC fouling exists.

Figure 3:
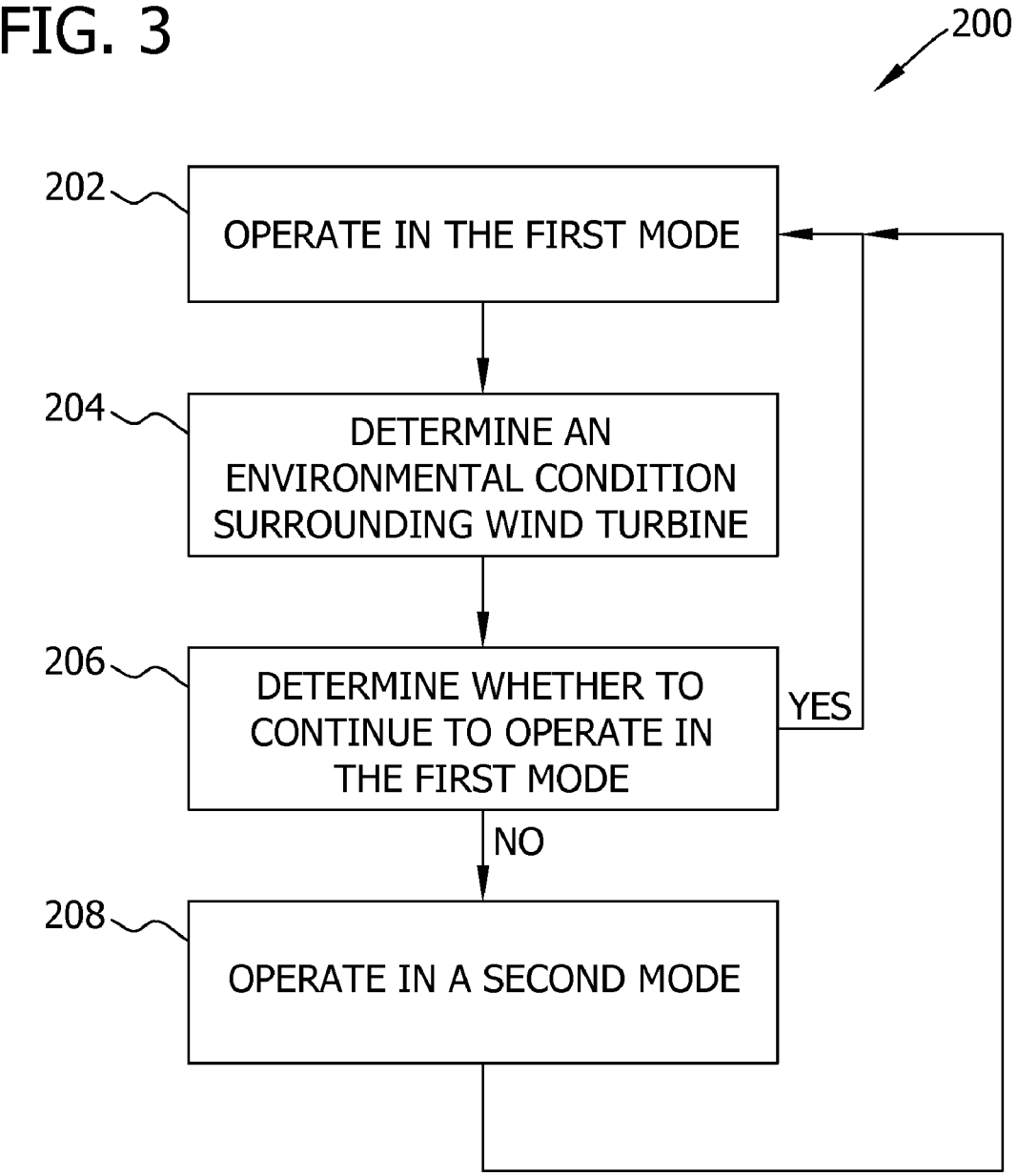
FIG. 3 is a flowchart of an exemplary method for operating the wind turbine shown in FIG. 1.

FIG. 3 illustrates an exemplary method 200 of operating wind turbine 10 (shown in FIG. 1). By performing method 200, fouling of rotor blade 16 (shown in FIGS. 1 and 2) and/or AFC system 100 (shown in FIG. 1) is facilitated to be corrected and/or prevented. Method 200 is performed by wind turbine controller 14 (shown in FIG. 1) and/or AFC controller 110 (shown in FIG. 1) sending commands and/or instructions to components of wind turbine 10, such as AFC system 100 and/or any suitable component. Wind turbine controller 14 and/or AFC controller 110 is programmed with code segments configured to perform method 200. Alternatively, method 200 is encoded on a computer-readable medium that is readable by wind turbine controller 14 and/or AFC controller 110. In such an embodiment, wind turbine controller 14 and/or AFC controller 110 is configured to read computer-readable medium for performing method 200.

Referring to FIGS. 1-3, method 200 includes operating 202 wind turbine 10 in a first mode, such as a normal mode. The term "normal mode" refers to a mode of operating wind turbine 10 and/or AFC system 100 such that AFC system 100 a drives a flow of fluid to increase lift on at least one rotor blade 16. The normal mode includes normal operation over a substantially entire power curve; operating when a wind speed is too low to generate power but wind turbine 10 is prepared to generate power; using constant and variable speed-ranges; operating within a peak shaver range; operating in an above rated condition; and/or performing a storm cut out. Flow characteristics of the fluid flow during the normal mode are determined empirically and/or are predetermined to achieve optimal lift on rotor blade 16 depending on ambient conditions, such as a wind speed and/or a wind direction, precipitation, and/or other atmospheric and/or environmental conditions. At least one flow characteristic of the fluid flow may be adjusted and/or varied during the normal mode, based on changing ambient conditions and/or operating characteristics of wind turbine 10, to facilitate achieving optimal blade lift.

Wind turbine 10 and/or AFC system 100 is operated 202 in the normal mode according to a predetermined schedule and/or based on wind conditions. For example, when wind speeds are high, operation 202 of AFC system 100 is substantially terminated because increased lift on rotor blade 16 is not desired in such wind conditions. However, even when active flow control is terminated, enough fluid is discharged from apertures 102 to facilitate preventing insects and/or other debris from flying into manifolds 104. Such termination of active flow control is considered to be part of the normal operating mode.

As wind turbine 10 is operating 202 in the normal mode, wind turbine 10 determines 204 at least one environmental condition surrounding wind turbine 10. More specifically, wind turbine 10 collects data using sensor 12 and processes the data to determine 204 the environmental condition. Based on the environmental condition, it is determined 206 whether to operate wind turbine 10 in the normal mode or in a second mode, such as a cleaning mode. As used herein, the term "second mode" refers to a mode of operating wind turbine 10 and/or AFC system 100 to achieve an outcome in addition to or different than optimal lift on rotor blade 16. As used herein, the term "optimal lift" refers to lift that maximizes power production and reduces the cost of power production, such as a lift that is optimized to account for initial costs of wind turbine 10 and/or a lift that produces a maximized ratio of annual energy capture over initial cost; however, any suitable optimization scheme can be used to achieve optimal lift. It should be understood that wind turbine 10 can be operated in more than two modes. In the exemplary embodiment, the second mode is a mode that is intentionally beneficial for performing a cleaning operation rather than performing an operation target, such as capturing energy. During the second mode, AFC system 100 is controlled to facilitate removing debris from AFC system 100. The second mode includes at least one cleaning mode to facilitate removing debris from AFC system 100.

By comparing the environmental condition with certain criteria, it is determined 206 whether to operate wind turbine 10 in the normal mode or in the second mode. If it is determined 206 to operate in the first mode, wind turbine 10 continues performing steps 202 and 204. If it is determined 206 to operate in the second mode, wind turbine 10 switches from the first mode to operate 208 in the second mode. Based on a time period, an operator's command, sensed environmental conditions, and/or any other suitable criteria, wind turbine 10 operates 208 in the second mode then returns to operating 202 in the first mode.

Figure 4:
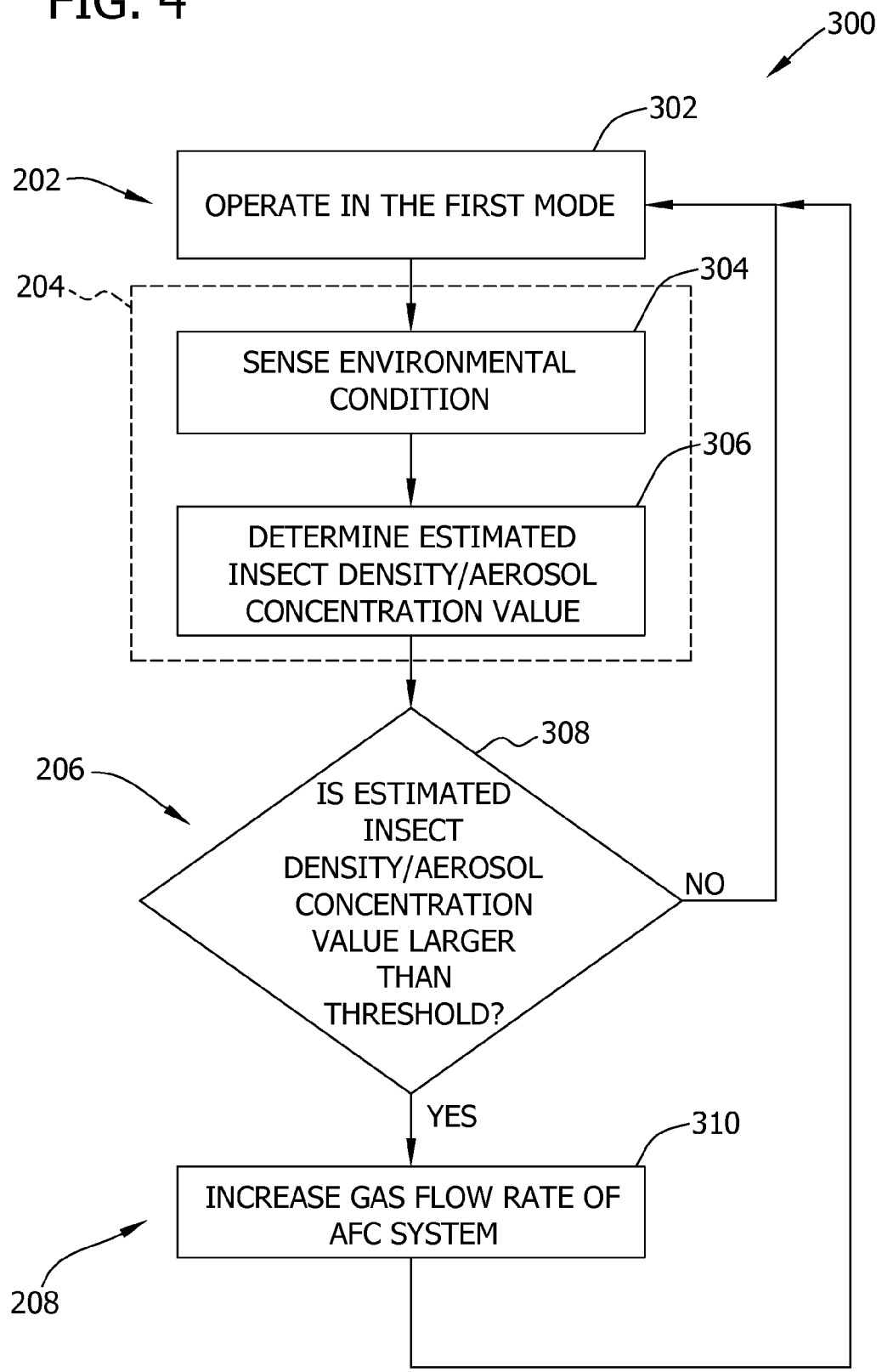
FIG. 4 is a flowchart of a first alternative method for operating the wind turbine shown in FIG. 1.

FIG. 4 is a flowchart of a first example method 300 for operating wind turbine 10 (shown in FIG. 1). Method 300 includes at least some of the steps of method 200 (shown in FIG. 3) and, as such, similar steps are indicated with similar reference numbers. Referring to FIGS. 1, 2, and 4, while wind turbine 10 is operating 302 in the first mode, method 300 starts by determining 204 an environmental condition of wind turbine 10 indicative of fouling of AFC system 100 by sensing 304 an environmental condition using sensor 12. At least one sensed environmental condition is used to determine 306 specific values that indicate a higher risk of fouling of AFC system 100 of wind turbine 10. More specifically, estimated insect density and/or aerosol concentration are determined 306 from the sensed environmental condition.

For example, insect density, concentration of dust, impurities, or aerosols or the like are typical indicators that an elevated risk of AFC fouling exists. For example, on days with specific weather conditions, flying insects are likely to fly in the air next to wind turbine 10. Such flying insects may enter manifolds 104 of AFC system 100 via apertures 102, thus clogging manifolds 104 and apertures 102. Similarly, fouling of AFC system 100 is more likely when there is a high concentration of dust particles or aerosols in the ambient air. Such conditions are detected 304 by sensor 12 either directly or indirectly. For example, empirical knowledge or theoretical considerations may connect certain weather conditions with high insect activity or high aerosol concentration. Therefore, a higher aerosol concentration may be indirectly determined 306 from the actual weather conditions.

According to another example, sensed environmental conditions can be used to determine 306 insect density. Certain species of insects prefer to fly in conditions of high air humidity, low winds, and temperatures above 10° C. If all those conditions are fulfilled, probability is high that apertures 102 may be clogged by those insects.

The estimated insect density value and/or the estimated aerosol concentration value are determined 306 based on a state of the environmental condition sensed in step 304. According to further embodiments, additionally or alternatively to the estimated insect density value and/or the estimated aerosol concentration value, at least one of the above mentioned environmental conditions is used in method 300.

It is decided 308 whether the estimated insect density value and/or the estimated aerosol concentration value is larger than a respective threshold value. The threshold value need not be constant for a different environmental condition. The threshold value rather may be a complex function of various parameters, e.g. air humidity, air temperature, and/or other variables. In a particular embodiment, a typical value for the insect density threshold is in a range between about 0.003 $m^{-3}$ and about 0.01 $m^{-3}$, and an aerosol concentration threshold value is approximately equal to 10 $\mu g \cdot m^{-3}$. According to some embodiments, the threshold function is influenced by which part of a power curve wind turbine 10 is running, a history of fouling-reduction actions, and/or a history of the environmental condition, e.g. last couple of weeks or years. According to yet further embodiments, instead of the above mentioned step 308, a decision making process is implemented. In this decision making process, it is decided whether or not the detected environmental condition, in particular the measured insect density or aerosol density, makes it necessary to switch to the second mode, such as a fouling-reducing mode.

In the exemplary embodiment, if neither the estimated insect density value nor the estimated aerosol concentration value is larger than its respective threshold value, operation of wind turbine 10 is not changed from the first mode to the second mode. More specifically, in the exemplary embodiment, the operation parameters of wind turbine 10 are not changed based on the environmental conditions, and method 300 returns to step 302 to continue monitoring of the environmental condition surrounding wind turbine 10. It will be understood by those skilled in the art that any operation parameter may be adjusted based on considerations other than AFC fouling. In this context, energy yield and/or turbine loads are the most prominent consideration so that operation parameters, e.g. pitch angle, may be adjusted in order to increase the energy yield of the turbine. On the other hand, safety considerations must be observed so that very high wind speeds or faults in the electrical subsystem may cause a turbine shut-down without any insect bloom or dust in the air. Whether energy yield, safety requirements, fouling prevention or any other consideration prevails in a certain situation will be determined on the exact circumstances of this situation.

In step 308, in the event that the estimated insect density value and/or the estimated aerosol concentration value is larger than its respective threshold value, operation of wind turbine 10 is changed from the first mode to the second mode. More specifically, in the exemplary embodiment, the second mode includes increasing 310 the gas flow of AFC system 100 for blowing insects or impurities out of rotor blade 16 through apertures 102 and/or for preventing insects or impurities from entering rotor blade 16 through apertures 102. By blowing insects or impurities out of rotor blade 16 through apertures 102, AFC system 100 is cleaned, whereas by preventing insects or impurities from entering rotor blade 16 through apertures 102, AFC system 100 is prevented from fouling. By increasing 310 the gas flow through AFC system 100, clogging of apertures 102 of AFC system 100 by insects, aerosols, impurities, dust particles, dirt, and/or the like is prevented or at least reduced. Furthermore, not only apertures 102, but also manifolds 104, may be cleaned by increasing 310 the gas flow through AFC system 100. In this context, it is to be noted that cleaning is typically applied when wind turbine 10 is not producing power, whereas fouling prevention could be applied all the time and/or when demanded by the environmental condition.

After step 310, the cleaning of AFC system 100 ends and operation of wind turbine 10 returns 302 to the first mode. Typically, wind turbine 10 will continue to monitor 204 the environmental condition by returning to step 302. According to a further embodiment, an operator may choose to continue with step 302, to end method 300, and/or to continue with a different method.

Figure 5:
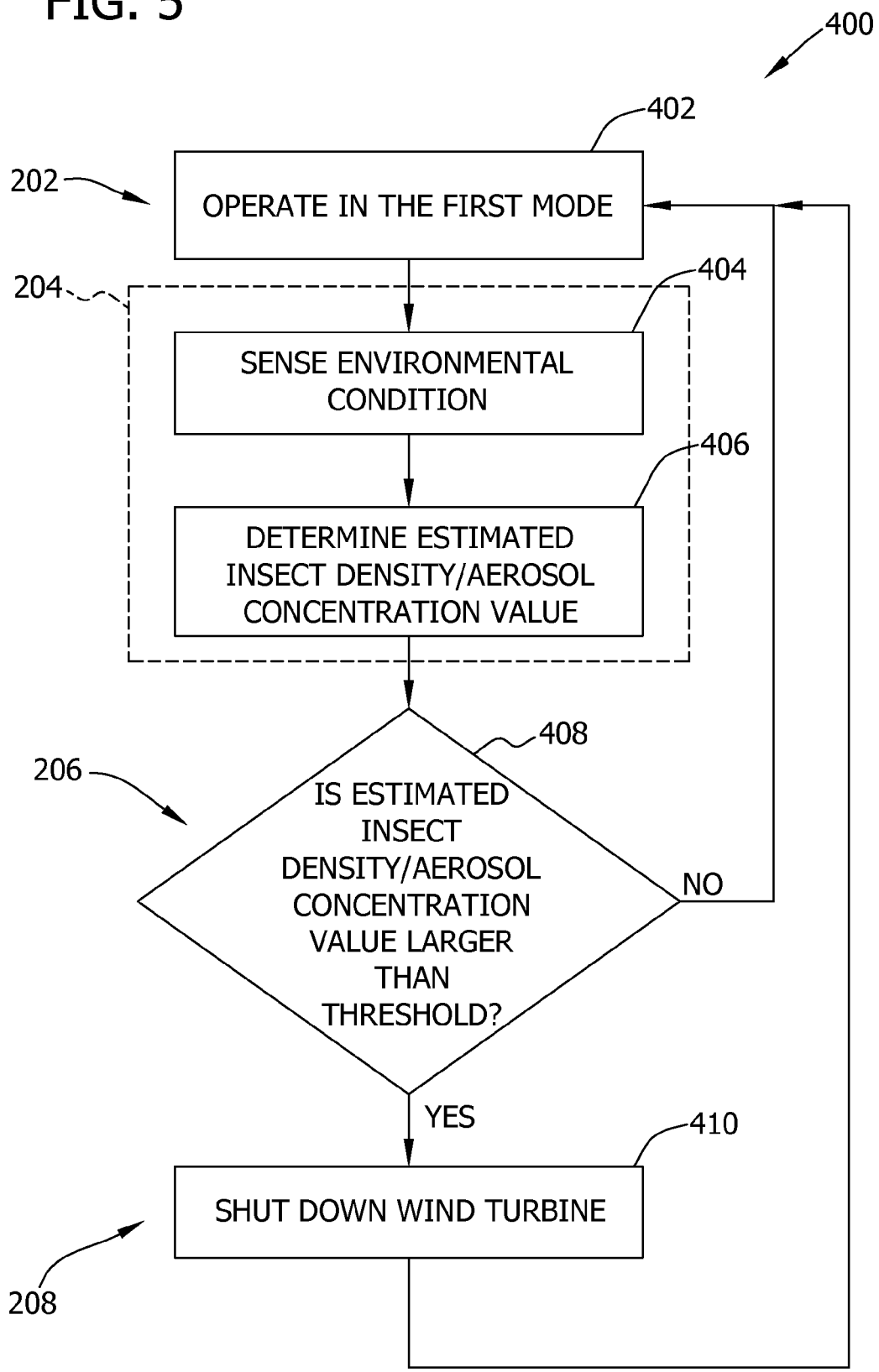
FIG. 5 is a flowchart of a second alternative method for operating the wind turbine shown in FIG. 1.

FIG. 5 is a flowchart of a second example method 400 for operating wind turbine 10 (shown in FIG. 1). Method 400 includes at least some of the steps of method 200 (shown in FIG. 3) and, as such, similar steps are indicated with similar reference numbers. Referring to FIGS. 1, 2, and 5, while wind turbine 10 is operating 402 in the first mode, method 400 includes determining 204 an environmental condition surrounding wind turbine 10 indicative of fouling of AFC system 100. In general, wind turbine 10 is operated such that, based on the detected environmental condition, fouling of AFC system 100 is reduced.

To determine 204 the environmental condition, at least one environmental condition is measured and/or sensed 404 by sensor 12. The measured or sensed value is then processed to determine 406 an estimated insect density value and/or an estimated aerosol concentration value.

In step 408, it is then decided whether the estimated insect density value and/or the estimated aerosol concentration value is larger than its respective threshold value. The threshold value need not be constant for a different environmental condition. The threshold value rather may be a complex function of various parameters, e.g. air humidity, air temperature, and/or other variables. According to some embodiments, the threshold function is influenced by which part of a power curve wind turbine 10 is running, a history of fouling-reduction actions, and/or a history of the environmental condition, e.g. last couple of weeks or years. According to yet further embodiments, instead of the step 408, a decision making process is implemented. In this decision making process, it is decided whether or not the detected environmental condition, in particular the measured insect density or aerosol density, makes it necessary to switch to the second mode, such as a fouling-reducing mode.

In the exemplary embodiment, if neither the estimated insect density value nor the estimated aerosol concentration value is larger than its respective threshold value, wind turbine 10 continues operating 402 in the first mode. More specifically, the operation parameters of wind turbine 10 are not changed, and method 400 returns to step 402 to continue monitoring the environmental condition surrounding wind turbine 10. As explained above, considerations other than AFC fouling may result in adjusting the operational parameters.

In the event that the estimated insect density value or the estimated aerosol concentration value is larger than its respective threshold value, operation of wind turbine 10 is changed from the first mode to the second mode, and wind turbine 10 operates 410 in the second mode for some time. More specifically, in the exemplary embodiment, the second mode includes shutting down 410 wind turbine 10. According to some embodiments, when shutting down 410 wind turbine 10, rotor blades 10 may be pitched to a feathered position to avoid insects hitting a region of blade surface 30 where manifolds 104 and/or apertures 102 are located.

After step 410, an operator or wind turbine controller 14 may restart wind turbine 10 to operate 402 in the first mode at some point when both the insect concentration and the aerosol concentration have dropped below their respective threshold values. To this end, the environmental conditions may be further monitored while wind turbine 10 is shut down 410. The operator may also have the option to continue with another method of operating wind turbine 10.

Figure 6:
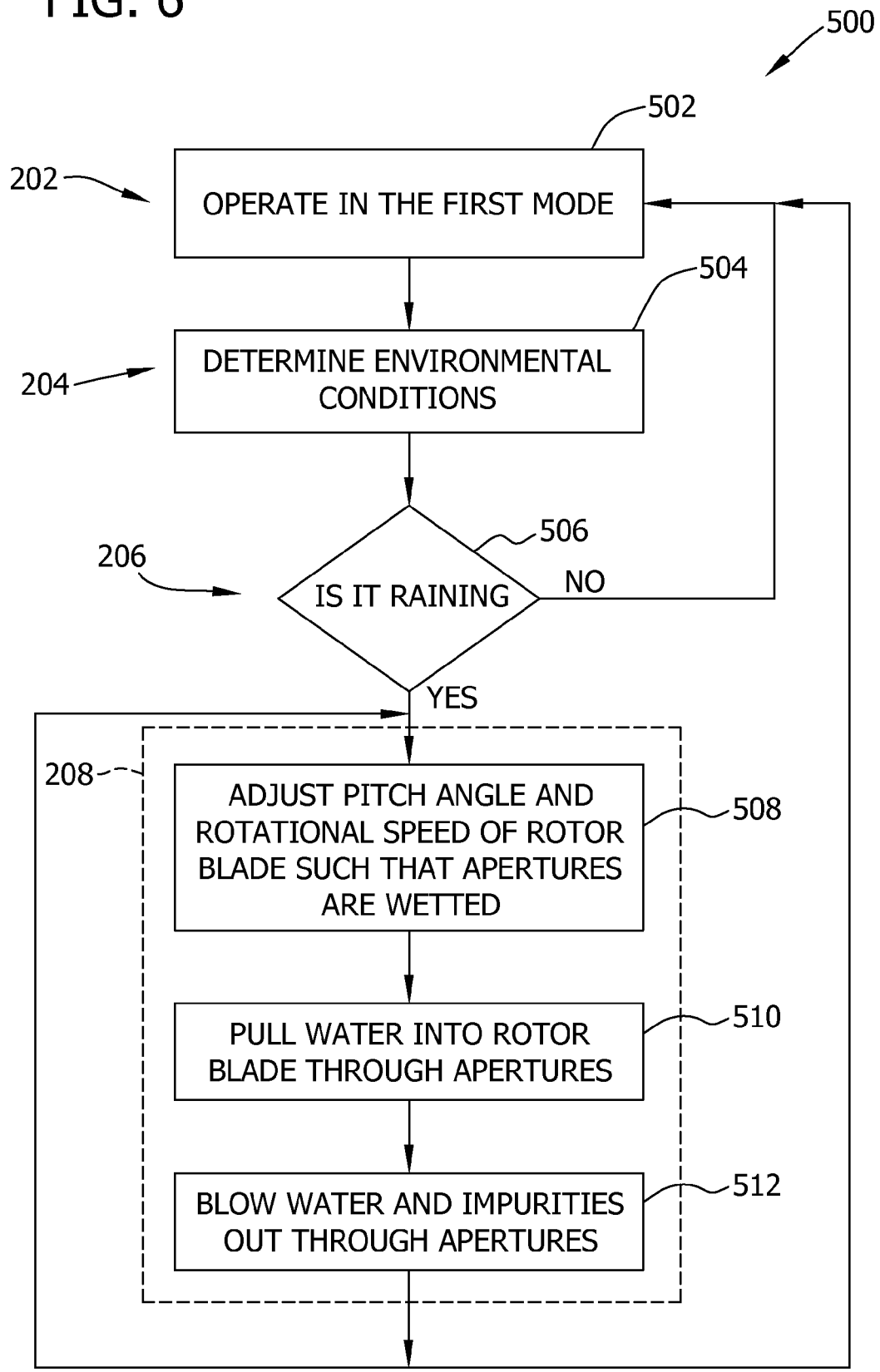
FIG. 6 is a flowchart of a third alternative method for operating the wind turbine shown in FIG. 1.

FIG. 6 is a flowchart of a second example method 500 for operating wind turbine 10 (shown in FIG. 1). Method 500 includes at least some of the steps of method 200 (shown in FIG. 3) and, as such, similar steps are indicated with similar reference numbers. Referring to FIGS. 1, 2, and 6, while wind turbine 10 is operating 502 in the first mode, method 500 includes determining 504 environmental conditions, such as a presence of precipitation, using sensor 12. Based on data collected by sensor 12, wind turbine 10 determines 506 whether or not it is precipitating at the respective moment. In the event it is not precipitating, steps 502 and 504 are repeated until there is precipitation. Thus method 500 only continues to execute operations in case precipitation is detected. Method 500 is described with respect to detecting rain, however it should be understood that method 500 may be performed with any suitable precipitation.

In the event a rain shower is detected in step 506, method 500 includes operating 208 wind turbine 10 in the second mode rather than the first mode. More specifically, when it is determined 506 that it is raining, method 500 continues to step 508 where pitch angles of rotor blades 16, an azimuth angle of rotor blade 16, and/or a rotor blade rotational speed are adjusted such that apertures 102 of AFC system 100 are wetted by the rain. To this end, rotor blades 16 are rotated such that apertures 102 face a rain direction relative to rotor blades 16. In this connection, "facing" means that an angle between a surface normal of aperture 102 and the rain direction is smaller than about 90°. In other words, rotor blades 16 are positioned such that rain impinges onto rotor blade surface 30 in an area where apertures 102 are located. Typically apertures 102 face a similar direction so that the technical meaning of the above is easily understood by a person skilled in the art.

In the exemplary embodiment, after wetting of apertures 102, the rain water is pulled 510 into rotor blades 16, more particularly into manifolds 104 formed within rotor blades 16, through apertures 102. This is typically accomplished by reversing a gas flow direction of AFC system 100 to the upstream direction. In other words, the gas flows into apertures 102 and towards gas supply 106. As described above, this may, for example, be achieved by reversing a pumping direction and/or a rotation direction of a fan or similar device. To further increase the reverse gas flow, in some embodiments, a pitch angle of each rotor blade 16 is adjusted such that a static pressure at apertures 102 is increased to force air to flow into apertures 102. Generally, before this is done, the AFC mode is stopped or, even better, an inward gas flow into apertures 102 is initiated. Thus, the reversed operation of AFC gas supply 106 and the static pressure cooperate in order to increase the gas flow into apertures 102. According to other embodiments, instead of actively pulling 510 water into rotor blade 16 through apertures 102, water enters apertures 102 and manifolds 104 due to gravity, cavitation, and/or capillary forces.

In step 512, the rain water and impurities within manifolds 104 and apertures 102 are blown out of rotor blade 16. To this end, the gas flow direction of AFC system 100 is again reversed to a downstream flow in which the gas flows from gas supply 106 towards apertures 102. In some embodiments, this downstream gas flow is assisted by adjusting the pitch angle of each rotor blade 16 and/or an azimuth angle of rotor blade 16 such that a dynamic pressure at apertures 102 is increased to pull the gas out of apertures 102. By blowing rain water and impurities out of rotor blade 16, manifolds 104 and apertures 102 are cleaned and, thus, fouling of AFC system 100 is reduced. After cleaning of rotor blades 16, method 500 may continue at step 208, or may return to step 502.

Figure 7:
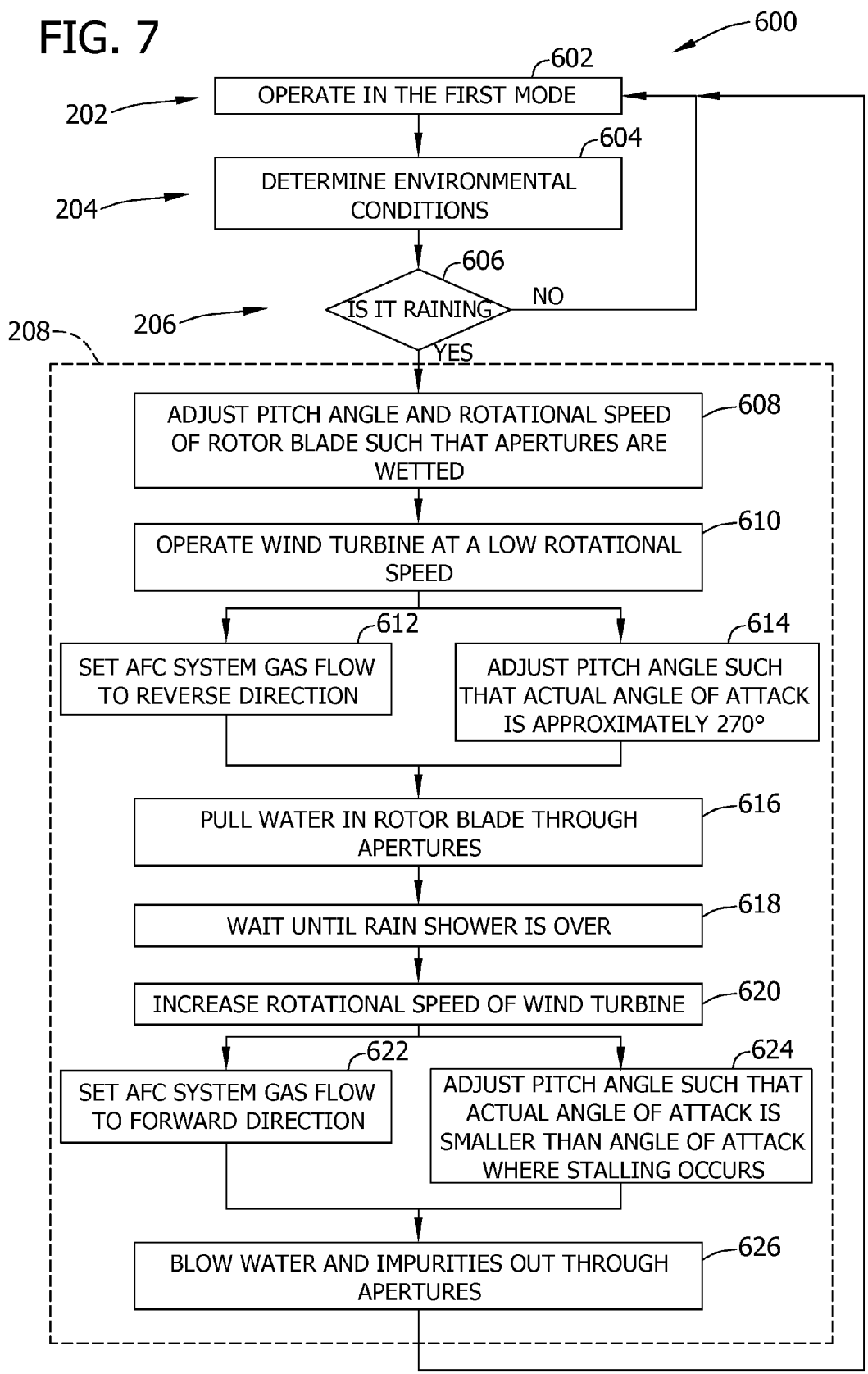
FIG. 7 is a flowchart of a fourth alternative method for operating the wind turbine shown in FIG. 1.

FIG. 7 is a flowchart of a second example method 600 for operating wind turbine 10 (shown in FIG. 1). Method 600 includes at least some of the steps of method 200 (shown in FIG. 3) and, as such, similar steps are indicated with similar reference numbers. Referring to FIGS. 1, 2, and 7, while wind turbine 10 is operating 602 in the first mode, method 600 includes determining 604 environmental conditions, such as a presence of precipitation, using sensor 12. Based on data collected by sensor 12, wind turbine 10 determines 606 whether or not it is precipitating, such as raining, at the respective moment. These detection steps 604 and 606 are looped until precipitation is detected. Thus method 600 only continues to execute operations in case of precipitation. Method 600 is described below with respect to detecting rain, however it should be understood that method 600 may be performed with any suitable precipitation.

In the event of a rain shower, method 600 includes operating 208 wind turbine 10 in the second mode rather than the first mode. More specifically, in the exemplary embodiment, method 600 continues to step 608 where pitch angles of rotor blades 16, an azimuth angle of rotor blade 16, and/or a rotor blade rotational speed are adjusted such that apertures 102 are wetted. To this end, rotor blades 16 are rotated such that apertures 102 face a rain direction. According to other embodiments, rotor blades 16 are rotated such that apertures 102 face the wind direction.

In the exemplary embodiment, after step 608, wind turbine 10 is operated 610 at such a low rotational speed that spinning off of water from rotor blades 16 is reduced. Typically, for wind turbine 10 having blade lengths of about 50 meters, and a tower height of about 16 meters, this happens at a rotational speed between about 5 rotations per minute (rpm) and about 15 rpm. Thus, more rain water remains on rotor blades 16 and is available for dissolving and/or suspending contaminants and/or for rinsing apertures 102 and manifolds 104 of AFC system 100.

The next step of the method may be step 612 or step 614 or a combination of both applied simultaneously or sequentially. In step 612, a gas flow direction of gas supply 106 is reversed with respect to a direction of gas flow during an AFC mode. In other words, the gas flow direction is now upstream so that air and water at or near apertures 102 are pulled 616 into rotor blade 16 from blade surface 30. Thus, apertures 102 and/or manifolds 104 of AFC system 100 are rinsed with rain water.

In the exemplary embodiment, in particular, AFC controller 110 and gas supply 106 are configured to reverse 612 the gas flow direction. In other words, AFC system 100 is configured to switch to an upstream gas flow, in contrast to the downstream gas flow during the AFC mode. For example, this may be achieved by reversing 612 the pumping direction if gas supply 106 includes a pump, or by reversing 612 the rotational direction if gas supply 106 includes a fan or similar device. It will be understood by those skilled in the art that the foregoing is only meant as non-limiting examples.

Figure 8:
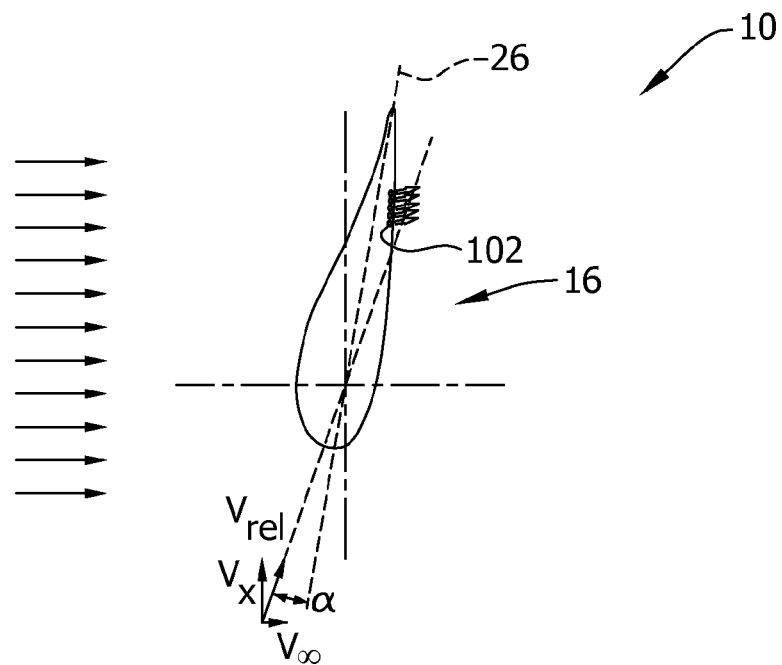
FIG. 8 is a schematic view of the rotor blade shown in FIG. 2 during performance of the method shown in FIG. 7 as coupled to a rotating rotor.
Figure 9:
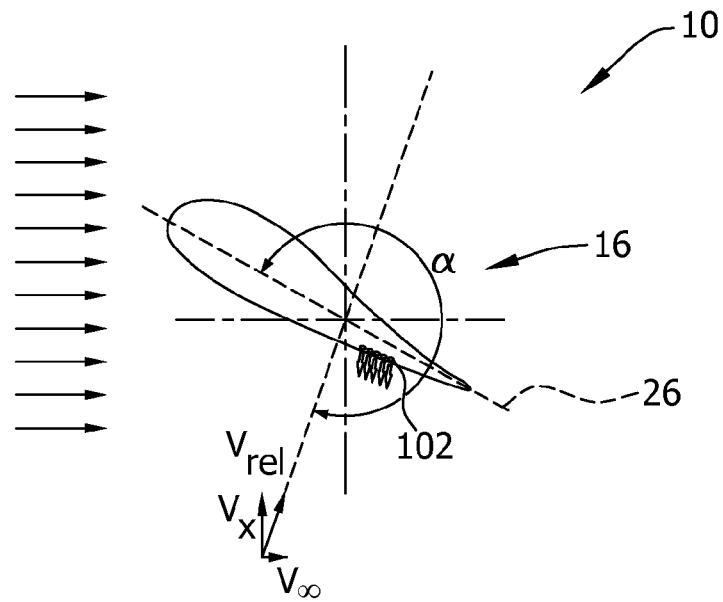
FIG. 9 is a schematic view of the rotor blade shown in FIG. 2 during performance of the method shown in FIG. 7 as coupled to a rotating rotor.

To assist this reversed gas flow, a pitch angle of rotor blades 16 may be adjusted 614 such that an actual angle of attack α is about 270°. In some embodiments, especially where the gas flow direction of gas supply 106 cannot be reversed, step 614 is applied alternatively to step 375. The situation in step 614 is shown with more detail in FIGS. 8 and 9 for a rotating rotor blade and in FIGS. 10 and 11 for a non-rotating rotor blade. Therein, angle of attack α is defined as an angle between chord line 26 and a velocity vector $v_{rel}$ representing a relative motion between rotor blade 16 and inflow. For the non-rotating rotor blade shown in FIGS. 10 and 11, vector $v_{rel}$ equals an ambient wind vector in direction and magnitude. For a rotating rotor blade, which case is depicted in FIGS. 8 and 9, the relative wind velocity $v_{rel}$ is determined as a vector sum of $v_\infty$ being the ambient wind speed vector and the rotational speed vector $v_x$ of rotor blade 16. In this context, it is observed that rotational velocities of rotor blades 16 may be larger than typical wind speeds. This vector sum is done graphically within FIGS. 8 and 9. According to other embodiments, in step 614, actual angle of attack α is chosen in q range between about 18° and about 330°. In this range, air is forced to flow or pulled 616 into apertures 102.

Figure 11:
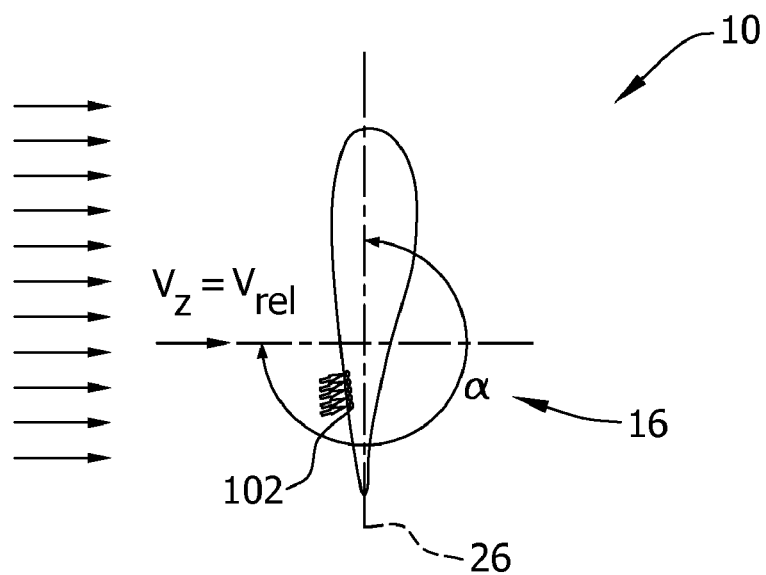
FIG. 11 is a schematic view of the rotor blade shown in FIG. 2 during performance of the method shown in FIG. 7 as coupled to a non-rotating rotor.

FIGS. 9 and 11 show situations where actual angle of attack α is about 270°. In these situations, air is forced to flow or is pulled 616 into apertures 102. This can be seen very easily for the case of a non-rotating rotor blade 16 because, in that case, wind blows directly into apertures 102 on the suction side of rotor blade 16, as depicted in FIG. 11. FIG. 9 shows the case for a rotating rotor blade. According to other embodiments, actual angle of attack α is in the range between about 18° and about 330°. In this range, air is forced to flow or is pulled 616 into apertures 102.

Figure 10:
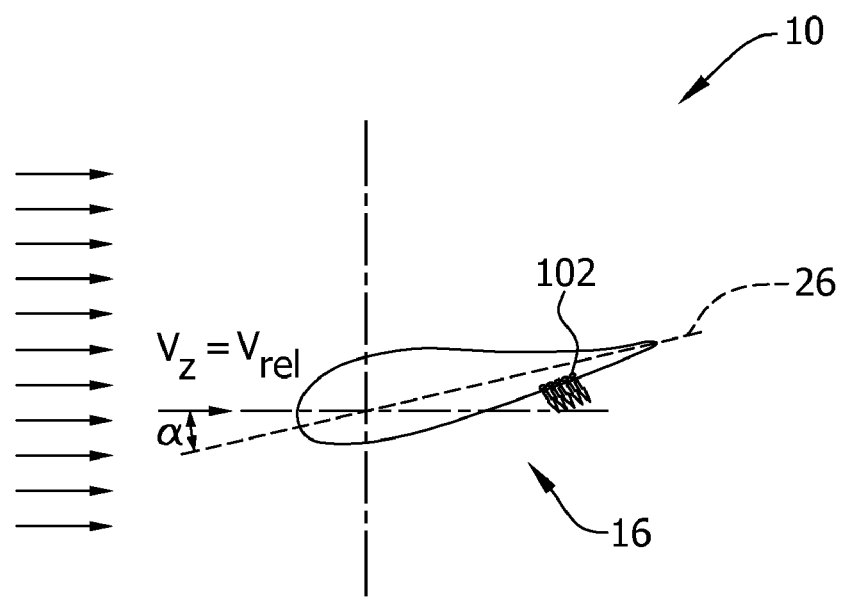
FIG. 10 is a schematic view of the rotor blade shown in FIG. 2 during performance of the method shown in FIG. 7 as coupled to a non-rotating rotor.

On the other hand, FIGS. 8 and 10 show situations for a rotating rotor blade and a non-rotating rotor blade, respectively, when an outward, i.e. downstream, gas flow is promoted. In this event, angle of attack α is set to a value smaller than a stall angle. The stall angle is defined as an angle at which stalling of a section of rotor blade 16, i.e. complete flow separation, occurs.

Referring again to FIG. 7, after reversing the gas flow direction in steps 612 and 614, rain water is pulled 616 into manifolds 104 through apertures 102. In the following, apertures 102 and/or manifolds 104 of AFC system 100 are rinsed with the rain water. After the rain water has dissolved and loosened the impurities within apertures 102 and manifolds 104, the impurities are rinsed or blown out of rotor blade 16.

To this end, ending of the rain shower may be awaited in step 618. Subsequently, a rotational speed of wind turbine 10 is increased in step 620. By increasing 620 the rotational speed of wind turbine 10, the water and impurities on or inside rotor blade 16 are thrown out or spun off rotor blade 16 thus cleaning rotor blade 16, and in particular AFC system 100. It will be understood by those skilled in the art steps 618 and/or 620 are optional and either or both step may be omitted.

After the optional steps 618 and 620, method 600 continues with combined or alternative steps 622 and 624. This means the next step of method 600 may be step 622 or step 624 or a combination of both applied simultaneously or sequentially. Typically both steps 622 and 624 are executed simultaneously or consecutively in order to amplify their effect.

In step 622, the gas flow direction of AFC system 100 is again reversed and set to the downstream direction. In that case, the gas flows from gas supply 106 to apertures 102. This promotes gas to flow out of apertures 102. To assist this outward gas flow, the pitch angles of rotor blades 16 may be adjusted such that actual angle of attack α is smaller than a stall angle, i.e. an angle of attack where stalling occurs.

FIGS. 8 and 10 show situations where actual angle of attack α is smaller than the stall angle for the case of a rotating rotor blade and a non-rotating rotor blade, respectively. At the stall angle, rotor blade 16 has maximum lift. If actual angle of attack α becomes larger than the stall angle, wind turbine 10 generates less power and the unsteadiness in the aerodynamic response of a given airfoil is increased. Both effects are undesirable. In case angle of attack α is smaller than the stall angle, the flow at the given blade section is substantially attached. As the position of apertures 102 is on the suction side after the chord-wise location of maximum airfoil thickness of rotor blade 16, the gas flow out of apertures 102 will be promoted.

According to method 600, in the next step 626, the rain water together with the contaminants, e.g. insects or dirt, contained within manifolds 104 and apertures 102 are blown out due to the gas flow. By blowing out 626 rain water and impurities, manifolds 104 and/or apertures 102 of AFC system 100 are cleaned thus reducing fouling of AFC system 100. After rain water is blown out 626 of rotor blade 16, the operation of wind turbine 10 continues with step 208 or returns to step 602.

A technical effect of the system and methods described herein includes at least one of: (a) operating a wind turbine in a first mode; (b) determining an environmental condition surrounding a wind turbine indicative of fouling of an AFC system; (c) operating a wind turbine in a second mode different than a first mode based on an environmental condition, wherein the second mode facilitates reducing fouling of an AFC system; (d) determining an environmental condition surrounding a wind turbine indicative of precipitation; and (e) adjusting at least one of a pitch angle and an azimuth angle of at least one rotor blade such that at least one aperture is wetted.

This written description uses examples, including the best mode, to enable any person skilled in the art to make and use the described subject-matter. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope is defined by the claims, and may include such modifications and other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating a wind turbine having at least one rotor blade and an active flow control (AFC) system, the at least one rotor blade having at least one aperture defined through a surface thereof and the AFC system configured to modify aerodynamic properties of the at least one rotor blade by ejecting gas through the at least one aperture, said method comprising:
   operating the wind turbine in a normal mode;
   determining whether it is precipitating surrounding the wind turbine; and
   changing a mode of the wind turbine from the normal mode to a cleaning mode different than the normal mode based on the determination of precipitation, the cleaning mode including positioning the at least one rotor blade such that the at least one aperture is wetted by the precipitation.

2. The method according to claim 1, further comprising determining at least one of an air humidity, a wind speed, an air temperature, an aerosol concentration, an airborne particle concentration, an airborne contaminants concentration, a wind direction, a rain direction, a frequency of wind gusts, an atmospheric pressure, a wind chill factor, a cloud height, a cloud cover, a visibility, and a dew point.

3. The method according to claim 1, wherein the positioning comprises at least one of:
   adjusting a pitch angle of the at least one rotor blade; and
   adjusting an azimuth angle of the at least one rotor blade.

4. The method according to claim 1, wherein the positioning comprises positioning the at least one rotor blade relative to a rain direction such that the at least one aperture faces the rain direction.

5. A method of operating a wind turbine having at least one rotor blade and an active flow control (AFC) system, the at least one rotor blade having at least one aperture defined through a surface thereof and the AFC system configured to modify aerodynamic properties of the at least one rotor blade by ejecting gas through the at least one aperture, said method comprising:
   operating the wind turbine in a normal mode;
   determining whether an aerosol concentration value surrounding the wind turbine is above an aerosol concentration threshold value; and
   operating the wind turbine in a cleaning mode by increasing a gas flow rate of the AFC system when the aerosol concentration value is larger than an aerosol concentration threshold value.

6. A method of operating a wind turbine having at least one rotor blade and an active flow control (AFC) system, the at least one rotor blade including at least one aperture defined through a surface of the at least one rotor blade and the AFC system configured to modify aerodynamic properties of the at least one rotor blade, said method comprising:
   determining an environmental condition surrounding the wind turbine indicative of precipitation; and
   adjusting at least one of a pitch angle and an azimuth angle of the at least one rotor blade such that the at least one aperture is wetted.

7. The method according to claim 6, further comprising operating the wind turbine at a rotational speed that prevents the precipitation from spinning off of the at least one rotor blade.

8. The method according to claim 6, wherein at least one manifold is defined in the at least one rotor blade, said method further comprising:
   initiating an inward gas flow into the at least one manifold through the at least one aperture; and
   adjusting the pitch angle of the at least one rotor blade to increase a static pressure at the at least one aperture to promote air to flow into the at least one aperture.

9. The method according to claim 6, further comprising adjusting the pitch angle of the at least one rotor blade to reduce a static pressure at the at least one aperture to promote gas to flow out of the at least one aperture.

10. The method according to claim 6, further comprising adjusting the pitch angle of the at least one rotor blade such that an actual angle of attack of the at least one rotor blade is smaller than a stall angle.

11. The method according to claim 6, wherein at least one manifold is defined in the at least one rotor blade, said method further comprising:
   initiating an inward gas flow into the at least one manifold; and
   adjusting the pitch angle of the at least one rotor blade such that an actual angle of attack of the at least one rotor blade is about 270 degrees.

12. The method according to claim 6, further comprising:
   setting a gas flow direction of the AFC system to an upstream gas flow direction; and
   pulling rain water into the at least one aperture.

13. The method according to claim 12, further comprising:
   after pulling the rain water into the at least one aperture, setting the gas flow direction of the AFC system to a downstream gas flow direction; and
   blowing gas through the at least one aperture to remove the rain water and impurities in the rain water from inside the AFC system.

14. A wind turbine comprising:
   at least one rotor blade comprising at least one aperture defined through a surface thereof;
   an active flow control (AFC) system at least partially defined in said at least one rotor blade and in flow communication with said at least one aperture, said AFC system configured to modify aerodynamic properties of said at least one rotor blade;
   a sensor configured to determine precipitation surrounding said wind turbine; and
   a wind turbine controller configured to:
   operate said wind turbine in a normal mode; and
   change a mode of said wind turbine from the normal mode to a cleaning mode different than the normal mode depending on the determination of precipitation, the cleaning mode including positioning said at least one rotor blade such that said at least one aperture is wetted by the precipitation.

15. The wind turbine according to claim 14, wherein said sensor is a rain sensor.

16. The wind turbine according to claim 14, wherein said AFC system is configured to reverse a gas flow direction through said AFC system.

* * * * *